(12) United States Patent
Huff et al.

(10) Patent No.: US 8,542,949 B1
(45) Date of Patent: Sep. 24, 2013

(54) TIFF VALIDATION

(75) Inventors: Lowell Huff, Manchester, MO (US); James Milford Heddleson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 920 days.

(21) Appl. No.: 12/187,435

(22) Filed: Aug. 7, 2008

(51) Int. Cl.
*G06K 9/60* (2006.01)

(52) U.S. Cl.
USPC .......... 382/305; 235/375; 235/379; 358/1.15; 382/100; 382/112; 382/137; 705/35; 705/39; 705/42; 705/44

(58) Field of Classification Search
None
See application file for complete search history.

(56) References Cited

U.S. PATENT DOCUMENTS

| | | | |
|---|---|---|---|
| 5,600,732 A * | 2/1997 | Ott et al. | 382/112 |
| 5,689,579 A * | 11/1997 | Josephson | 382/137 |
| 5,783,808 A * | 7/1998 | Josephson | 235/379 |
| 6,751,335 B1 * | 6/2004 | Honsinger | 382/100 |
| 7,167,580 B2 * | 1/2007 | Klein et al. | 382/112 |
| 7,366,339 B2 * | 4/2008 | Douglas et al. | 382/137 |
| 7,389,256 B1 * | 6/2008 | Adams et al. | 705/35 |
| 7,802,717 B2 * | 9/2010 | Mueller et al. | 235/379 |
| 7,918,386 B2 * | 4/2011 | Mueller et al. | 235/375 |
| 7,996,312 B1 * | 8/2011 | Beck et al. | 705/42 |
| 8,387,862 B2 * | 3/2013 | Mueller et al. | 235/379 |
| 2002/0063888 A1 * | 5/2002 | Hisatake et al. | 358/1.15 |
| 2004/0015566 A1 * | 1/2004 | Anderson et al. | 709/219 |
| 2004/0109596 A1 * | 6/2004 | Doran | 382/137 |
| 2004/0181485 A1 * | 9/2004 | Finch et al. | 705/45 |
| 2005/0097046 A1 * | 5/2005 | Singfield | 705/42 |
| 2006/0182331 A1 * | 8/2006 | Gilson et al. | 382/137 |
| 2006/0280354 A1 * | 12/2006 | Murray | 382/137 |
| 2008/0000962 A1 * | 1/2008 | Cantley et al. | 235/379 |
| 2008/0006687 A1 * | 1/2008 | Mueller et al. | 235/379 |
| 2008/0086420 A1 * | 4/2008 | Gilder et al. | 705/44 |
| 2008/0086421 A1 * | 4/2008 | Gilder et al. | 705/44 |
| 2008/0097899 A1 * | 4/2008 | Jackson et al. | 705/39 |
| 2008/0104022 A1 * | 5/2008 | Ronca | 707/3 |
| 2008/0247629 A1 * | 10/2008 | Gilder et al. | 382/137 |
| 2009/0094148 A1 * | 4/2009 | Gilder et al. | 705/35 |

* cited by examiner

*Primary Examiner* — Tsung-Yin Tsai
(74) *Attorney, Agent, or Firm* — Michael A. Springs; Moore & Van Allen, PLLC; James C. Edwards

(57) ABSTRACT

An apparatus and method for validation of images and their associated Tag Image File Format (TIFF) tags in an image cash letter. One or more image cash letters (ICLs) are received. Each image cash letter is validated that it satisfies defined image and TIFF validation rules. Image cash letters are identified that have non-conforming images that do not pass the image and TIFF validation rules. Errors associated with the non-conforming images are automatically sent to an originator of the identified image cash letter that has the non-conforming images. Various reports may be generated identifying errors in the non-conforming images and associated originators of the errors.

11 Claims, 7 Drawing Sheets

| SEV LVL (501) | ERROR MESSAGE (502) | PERCENT OF TOTAL ERRORS (503) | TOTAL TIFF/X937 ERRORS (504) | NUMBER OF CSC CUSTOMERS (505) |
|---|---|---|---|---|
| 1 | CIMS IMAGE LENGTH (FRONT+BACK+SEGO) IS > 256K | 0.0177 | 2 | 1 |
| 1 | IMAGE HEIGHT BACK (= 000096 DPI) IS > 7 AND <= 8 INCHES | 0.0266 | 3 | 1 |
| 1 | IMAGE HEIGHT HACK (= 000200 DPI) IS > 6 AND <= 7 INCHES | 0.1064 | 12 | 1 |
| 1 | IMAGE HEIGHT FOR THE BACK IS LESS THAN 1.752 INCHES | 0.3547 | 40 | 8 |
| 1 | IMAGE HEIGHT FOR THE FRONT IS LESS THAN 1.752 INCHES | 0.0088 | 1 | 1 |
| 1 | IMAGE HEIGHT FRONT (= 000200 DPI) IS > 6 AND <= 7 INCHES | 0.1064 | 12 | 1 |
| 1 | IMAGE WIDTH BACK (= 000096 DPI) IS > 17 AND <= 18 INCHES | 0.0266 | 3 | 1 |
| 1 | IMAGE WIDTH BACK (= 000200 DPI) IS > 10.50 AND <= 11 INCHES | 0.0620 | 7 | 2 |
| 1 | IMAGE WIDTH FOR THE BACK IS LESS THAN 4.10 INCHES | 0.2749 | 31 | 7 |
| 1 | IMAGE WIDTH FOR THE FRONT IS LESS THAN 4.10 INCHES | 0.2306 | 26 | 5 |
| 1 | MULTI-STRIP IMAGES ARE NOT ALLOWED | 3.4770 | 392 | 7 |
| 1 | TAG 254 MUST BE LONG WITH COUNT ONE | 9.9698 | 1,124 | 2 |
| 1 | TAG 259 COMPRESSION MUST HAVE A VALUE OF 4 BUT IS 001 | 0.0266 | 3 | 1 |
| 1 | TAG 259 COMPRESSION MUST HAVE A VALUE OF 4 BUT IS 005 | 0.0177 | 2 | 1 |
| 1 | TAG 262 PHOTOMETRIC INTERPRETATION IS BLACKZERO | 0.0443 | 5 | 2 |
| 1 | TAG 266 FILL ORDER MUST HAVE A VALUE OF ONE BUT IS 002 | 44.2167 | 4,985 | 3 |
| 1 | TAG 274 MUST BE SHORT WITH COUNT ONE | 0.3636 | 41 | 2 |
| 1 | TAG 278 OMITTED: ROWS PER STRIP | 9.0828 | 1,024 | 3 |
| 1 | TIFF TAGS ARE NOT IN ASCENDING SEQUENCE WITHIN THE IFD | 0.6386 | 72 | 1 |
| 1 | TYPE 26/28 TRUNCATION INDICATOR NEVER SET TO Y | 0.0177 | 2 | 1 |
| 1 | X RESOLUTION BACK MUST BE 200/240, CALCULATED DPI = 000096 | 0.0266 | 3 | 1 |
| 1 | X RESOLUTION BACK MUST BE 200/240, CALCULATED DPI = 000100 | 0.0177 | 2 | 1 |
| 1 | X RESOLUTION BACK MUST BE 200/240, CALCULATED DPI = 000150 | 0.0177 | 2 | 2 |
| 1 | X RESOLUTION BACK MUST BE 200/240, CALCULATED DPI = 000300 | 0.0266 | 3 | 1 |
| 1 | X RESOLUTION FRONT MUST BE 200/240, CALCULATED DPI = 000100 | 0.1064 | 12 | 2 |
| 1 | X RESOLUTION FRONT MUST BE 200/240, CALCULATED DPI = 000150 | 0.0177 | 2 | 2 |
| 1 | X RESOLUTION FRONT MUST BE 200/240, CALCULATED DPI = 000300 | 0.0266 | 3 | 1 |
| 1 | Y RESOLUTION BACK MUST BE 200/240, CALCULATED DPI = 000096 | 0.0266 | 3 | 1 |
| 1 | Y RESOLUTION BACK MUST BE 200/240, CALCULATED DPI = 000100 | 0.0177 | 2 | 1 |
| 1 | Y RESOLUTION BACK MUST BE 200/240, CALCULATED DPI = 000150 | 0.0177 | 2 | 2 |
| 1 | Y RESOLUTION BACK MUST BE 200/240, CALCULATED DPI = 000300 | 0.0266 | 3 | 1 |
| 1 | Y RESOLUTION FRONT MUST BE 200/240, CALCULATED DPI = 000100 | 0.1064 | 12 | 2 |
| 1 | Y RESOLUTION FRONT MUST BE 200/240, CALCULATED DPI = 000150 | 0.0177 | 2 | 2 |
| 1 | Y RESOLUTION FRONT MUST BE 200/240, CALCULATED DPI = 000300 | 0.0266 | 3 | 1 |
| 1 | | 69.5494 | 7,841 | |
| 2 | TYPE 25 ONUS FIELD CONTAINS MORE THAN TWO SLASHES | 0.2838 | 32 | 20 |
| 2 | | 0.2838 | 32 | |
| 3 | TYPE 25 (FYI) ONUS FIELD DOES NOT CONTAIN AT LEAST ONE SLASH | 30.1667 | 3,401 | 213 |
| 3 | | 30.1667 | 3,401 | |
| | | 100.0000 | 11,274 | |

TIFF VALIDATION

BACKGROUND OF THE INVENTION

The present invention is related to verifying the suitability of images in incoming files for use in subsequent processing operations, and more specifically to Tag Image File Format (TIFF) validation.

The Check 21 legislation allowed image exchange files in the X9.37 standard format to be routed between banks for processing of financial transactions. A bank may not be able to successfully process an image if the tag image file format (TIFF) tags associated with the image were not created by application systems at the capturing institution per generally accepted industry standards. Even if the images and tags meet the generic requirements of the published standard, processing systems at receiving institutions may not properly process all combinations of image characteristics (size, etc.,) and the presence of specific tags and tag values. Accepting images that ultimately cannot be processed by the receiving bank's systems or systems at banks subsequent to the receiving bank can result in delays, manual exception processing, and customer dissatisfaction. Nonconforming images may not be able to be used in downstream systems such as online banking, image statements, CD-ROM creation, and downstream image enabled applications. These are not one time problems. A Check21 Image originating institution may be 100% in TIFF compliance and then have problems through the replacement of a machine, system or process (e.g., new low speed scanner) used for image processing. Hence these problems can be extremely low to non-existent in a steady state environment but then get created due to implemented changes. Currently, within many Financial Institutions there is no ongoing process that constantly monitors these problems. Further, there is no automated process for returning information regarding failed images to a sending institution for their correction, including a detailed description of the errors that were found, or correction of a machine or process causing the TIFF tag problems.

BRIEF SUMMARY OF THE INVENTION

According to one aspect of the present invention, a method for image and Tag Image File Format (TIFF) validation includes receiving at least one image cash letter (ICL), validating that each image in the at least one image cash letter satisfies defined image and TIFF validation rules, and identifying image cash letters that have non-conforming images that do not pass the image and TIFF validation rules.

According to another aspect of the present invention, an image and Tag Image File Format (TIFF) validation apparatus that includes an input device, a memory device, a display device, an application, the application being stored in the memory device, and a processor, the processor being connected to the input device, the memory device and the display device, wherein the application is configured to identify failed images in an image cash letter (ICL) that do not conform to image and TIFF validation rules, generate reports identifying errors in the failed image, and automatically notify an originator of the errors.

According to a further aspect of the present invention, is included an apparatus comprising a storage medium with instructions stored therein, the instructions when executed causing a processing device to perform receiving at least one image cash letter (ICL), validating that each image in the at least one image cash letter satisfies defined image and TIFF validation rules, and identifying image cash letters that have non-conforming images that do not pass the image and TIFF validation rules.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 5 shows a diagram of a tag system wide error summary report according to an exemplary embodiment of the present invention.

DETAILED DESCRIPTION OF THE INVENTION

Figure 1:
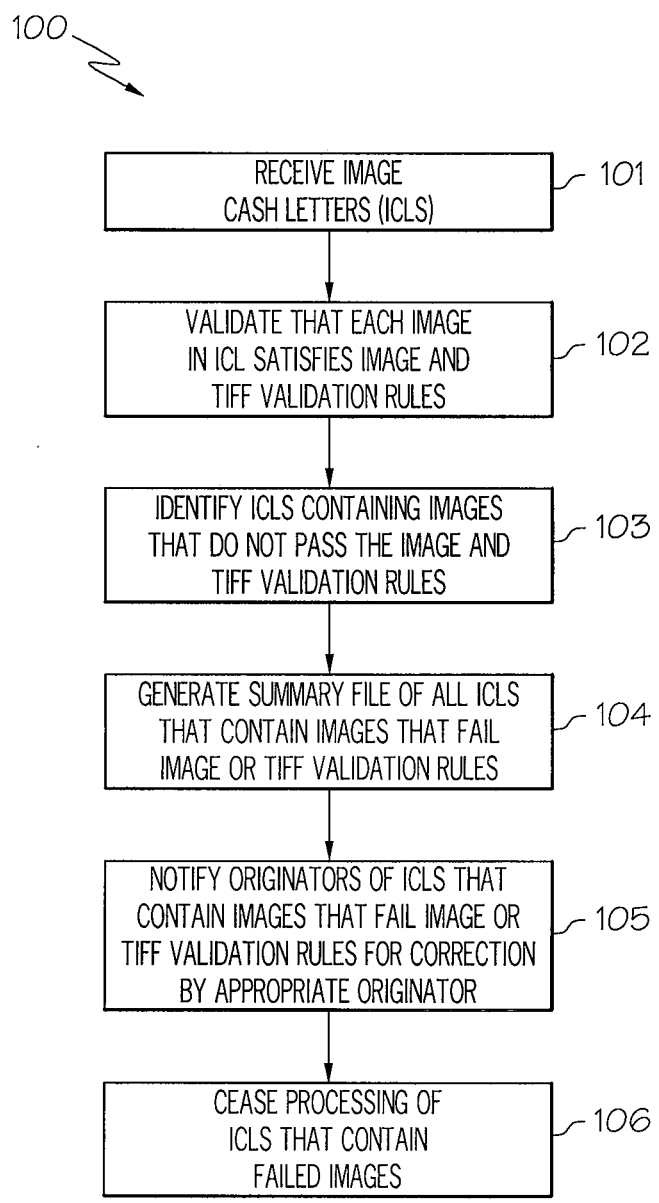
FIG. 1 shows a flowchart of a process for TIFF validation according to an exemplary embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments of the present invention are related to verifying the suitability of images in incoming files for use in subsequent processing operations. This includes verifying characteristics of the file and images. An example is validating the tags associated with images in the Tag Image File Format (TIFF) format.

According to embodiments of the present invention, all incoming X9.37 cash letters received at a financial institution, such as a bank, may be processed where image and TIFF validation rules are applied to identify checks or other instruments such as but not limited to postal money orders, in the cash letters that have nonconforming images based on the validation rules. Summary reports may be generated periodically (e.g., each business day) that provide detailed information such as, for example, the errors encountered, the errors by originating institutions, and detail on each error to allow the originating institution to be contacted so that they can correct their problems. Moreover, embodiments according to the present invention allow a TIFF validation process to be incorporated into a returns process that may replace nonconforming images with a general ledger (GL) debit or adjustment with an image cash letter returns (ICLR) cash letter sent back to the originating institution for their correction.

Errors that are related to nonconforming images may be written to both detail and summary reports that allow the originating institution to be contacted with detailed information regarding their specific errors. Summary reports may be created on both a system wide basis and originating institution basis to allow the most prevailing errors to be quickly identified and also to allow the offending institutions to be identified and notified. These summary reports may be created by collecting errors over a defined interval (for example business day) within an errors database and then utilizing that information to produce the summary reports for institution notification. In addition, according to embodiments of the present invention, an ICLR process may identify TIFF errors and then automatically return information about the errors or the images themselves or both to the originating institution. As noted previously, they may be returned in a data file in several different formats including as an ICLR returns cash letter. The general ledger and/or the deposit represented by the cash letter remains in balance by replacing the nonconforming check with a general ledger debit.

Embodiments according to the present invention provide: rules based validation that may identify required TIFF tags and the type, count, and acceptable values for each tag; rules based validations of the X9.37 data records which are applied at the same time that the image file is being analyzed; validation that the image was scanned at a desired scan rate (e.g. 200 or 240 dots per inch (DPI)); image size validation (in bytes) for the minimum and maximum size of the front and back of each check; image size validation (in inches) for the minimum and maximum size for the front and back of each check; image size validation (in bytes) for the combined front and back of each check to ensure that it does not exceed archive capability; collection of errors within a database by institution and error type; generation of summary and detail reports that allow each error to be tracked, to identify the common errors that are occurring, and to identify the specific errors that were generated by each financial institution; and ability to automate returns in the generation of an ICLR returns file for nonconforming images.

Embodiments according to the present invention may include a TIFF validator that may be an apparatus, software such as an application, or a combination thereof. A TIFF validator according to the present invention: reads the X9.37 image file; logically de-blocks the file based on X9.37 link standards; converts American Standard Code for Information Interchange (ASCII) to Extended Binary Coded Decimal Interchange Code (EBCDIC) as required; validates X9.37 record types; applies X9.37 editing rules to each X9.37 data record and generates error summary records on violations; locates each type 52 image record and validates that each check has both a front image and a back image; locates the TIFF image within the type 52 record; validates image file header (IFH) order (i.e., big endian vs. little endian) and generates errors if not acceptable; locates the image file directory (IFD) within the image and processes each IFD entry; validates each TIFF tag based on the validation rules file (e.g., type, count, values, etc.); generates summary and detail reports and exception files; and reports on image size exceptions (e.g., maximum and minimum) in both bytes and inches.

Embodiments according to the present invention may also include TIFF daily reporting that: processes the exception files that were created throughout the day; generates detailed reports on each error by institution (originating financial institution); generates summary reports on each error by originating institution; generates system wide summary reports on the types of errors encountered during the current day; and provides needed information to allow follow up with each originator on the specific problems that they have generated.

Embodiments according to the present invention may also include a TIFF return process that: allows the TIFF validator to be incorporated into an automated returns process; runs the front and back image for each type 25 check through the TIFF validator; replaces nonconforming checks with either a GL debit or a summary GL debit (may be controlled by a configuration file); creates an output ICLR file so that the nonconforming checks can be returned to the originator; and creates an updated X9.37 file (with the nonconforming images replaced with GL debits) so that it can be processed automatically.

FIG. 1 shows a flowchart of a process for TIFF validation according to an exemplary embodiment of the present invention. In the process 100, in block 101, image cash letters (ICLs) may be received. In block 102, each image in each image cash letter may be validated that it satisfies the image and TIFF validation rules. In block 103, any image cash letters containing images that do not pass the image and TIFF validation rules may be identified. In block 104, a summary file may be generated of all image cash letters that contain images that fail the image and/or TIFF validation rules. In block 105, originators of image cash letters that contain images that fail the image or TIFF validation rules may be notified to allow each appropriate originator to make corrections. In block 106, processing of image cash letters that contain images that fail the image or TIFF validation rules may cease.

Figure 2:
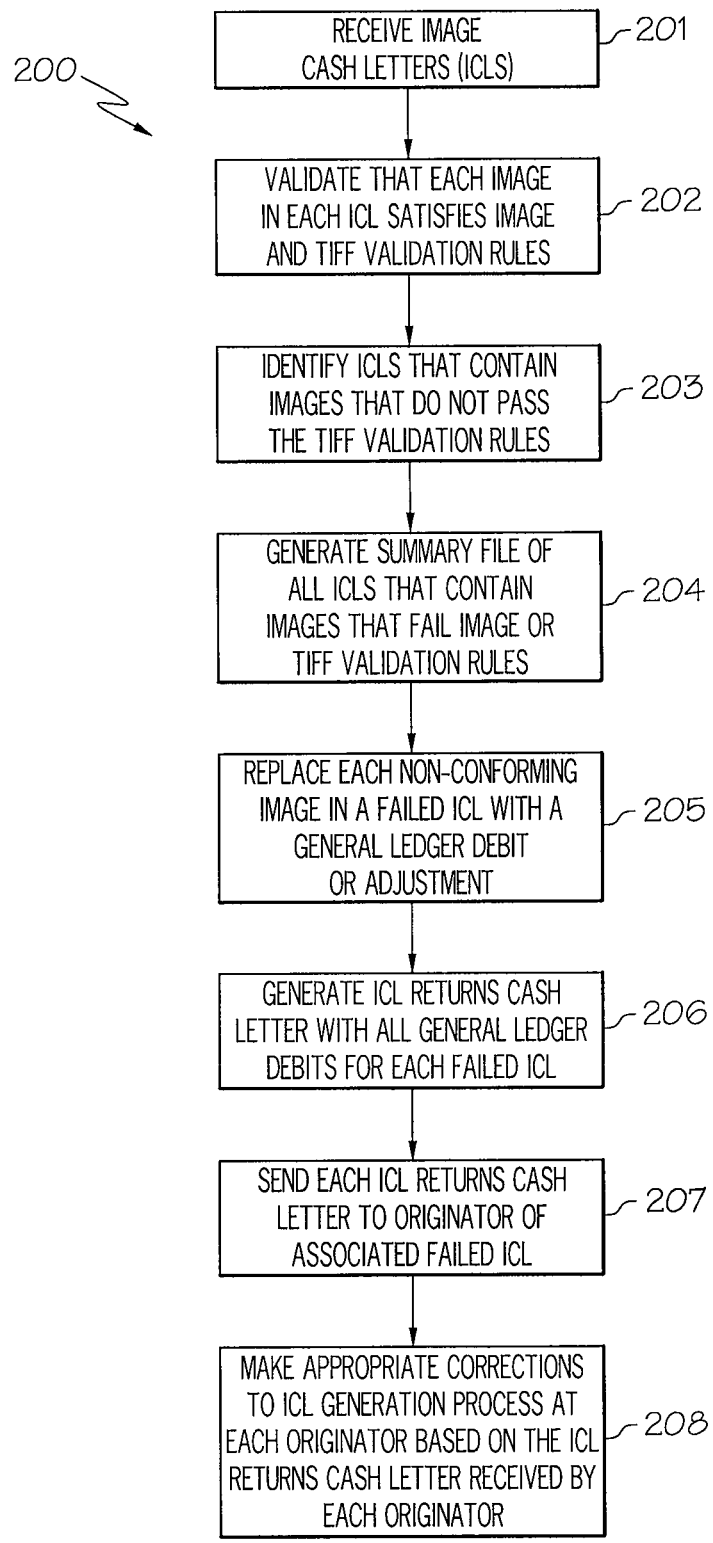
FIG. 2 shows a flowchart of a process for TIFF validation according to another exemplary embodiment of the present invention.

FIG. 2 shows a flowchart of a process for TIFF validation according to another exemplary embodiment of the present invention. In the process 200, in block 201, image cash letters may be received. In block 202, it may be validated that each image in each image cash letter satisfies image and TIFF validation rules. In block 203, image cash letters that contain images that do not pass the image and TIFF validation rules may be identified. In block 204, a summary file of all image cash letters that contain images that fail the image or TIFF validation rules may be generated. In block 205, each nonconforming image in a failed image cash letter may be replaced with a general ledger debit or adjustment. In block 206, an image cash letter returns (ICLR) cash letter may be generated containing all general ledger debits and/or all the failed images for each failed image cash letter. In block 207, each image cash letter returns cash letter may be sent to an originator of the associated failed image cash letter. In block 208, appropriate corrections may be made to the ICLR generation process and each originator based on the image cash letter returns cash letter received by each originator.

Figure 3:
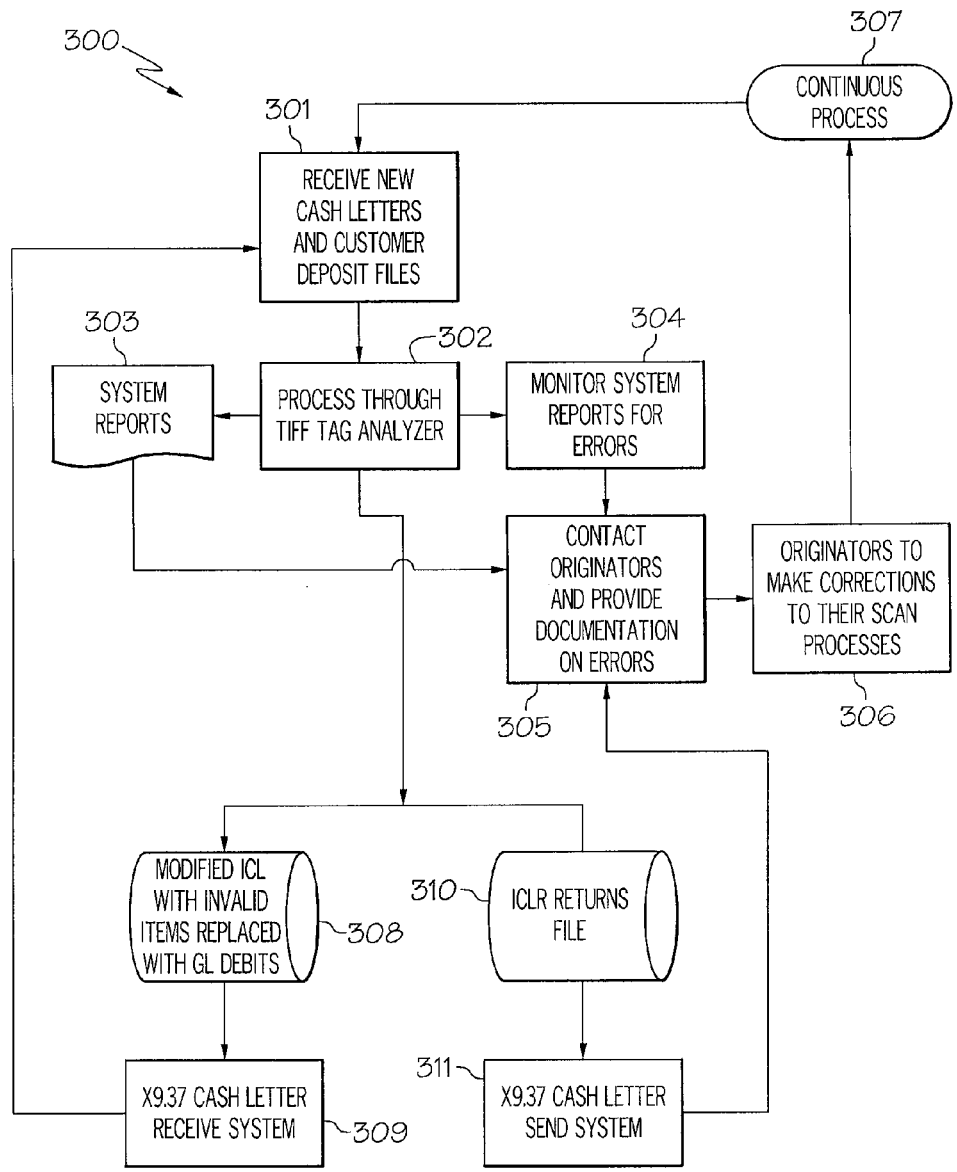
FIG. 3 shows a flowchart of an image property and TIFF tag monitoring and corrections process according to an exemplary embodiment of the present invention.

FIG. 3 shows a flowchart of an image property and TIFF tag monitoring and corrections process according to an exemplary embodiment of the present invention. In the process 300, in block 301, new cash letters and customer deposit files may be received. In block 302, the received cash letters and deposit files may be processed through an image and TIFF tag analyzer. In block 303, system reports may be stored. In block 304, system reports may be monitored for errors and then in block 305, originators of the cash letters and deposit files may be contacted and documentation provided to the originators on the errors. In block 306, the originators may make corrections to their image cash letter scan processes and then in block 307, the process may continue to block 301 where a new image cash letter and customer deposit file may be received.

After in block 303 system reports have been stored, then in block 305 the originators may also be contacted. After in block 302 the process is run through the image and TIFF tag analyzer, then in block 308, a modified image cash letter with invalid items may be replaced with general ledger debits and then in block 309, the process may return to the X9.37 cash letter receipt system where in block 301, a new cash letter may be received. Further, after the process is run through the image and TIFF tag analyzer, in block 310, an ICLR returns file may be generated and then in block 311, an X9.37 cash letter send system may be initiated and the process move again to block 305 where originators of the cash letters and deposit files may be contacted and documentation provided to the originators on the errors.

Figure 4A:
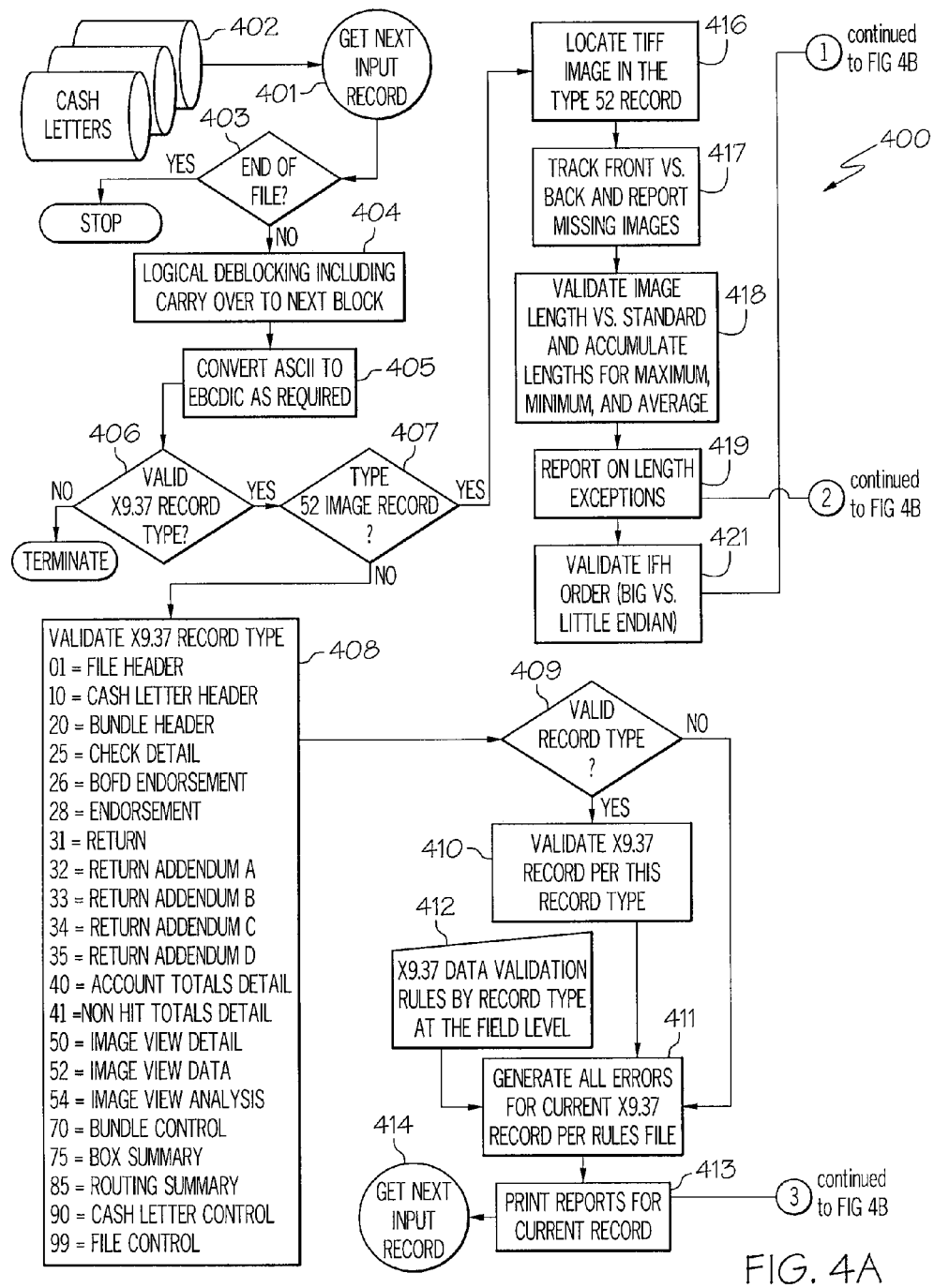
FIG. 4 shows a flowchart of an image and TIFF tag validator process according to an exemplary embodiment of the present invention.
Figure 4B:
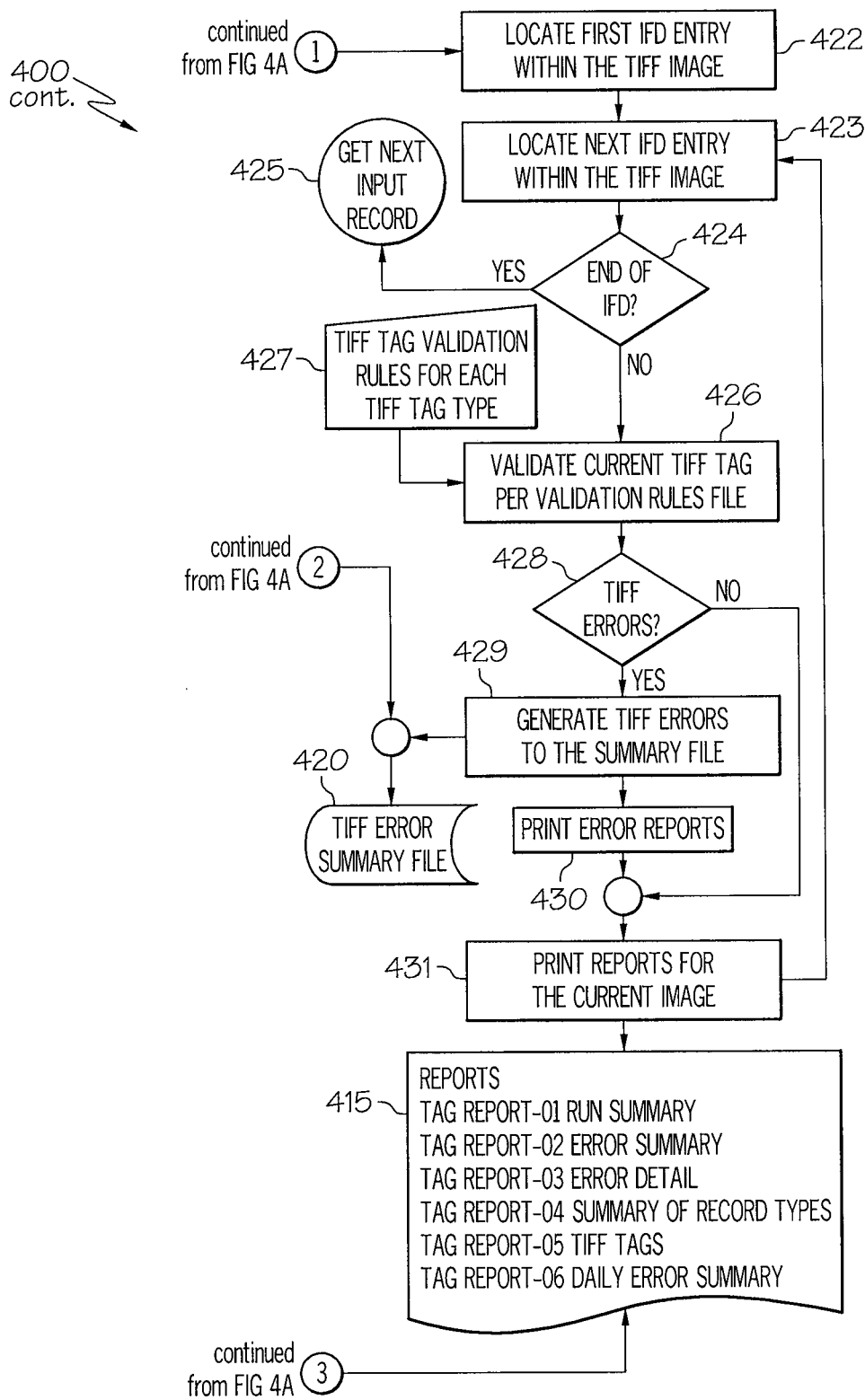

FIG. 4 shows a flowchart of an image and TIFF tag validator process according to an exemplary embodiment of the present invention. In the process 400, in block 401 a next input record (i.e., image cash letter) may be retrieved or received. In block 403 it may be determined if this is the end of file and if so, the process ends. If it is not the end of file, in block 404 logical de-blocking may occur including carryover to the next block. In block 405 ASCII to EBCDIC conversion may occur as required. In block 406 it may be determined if the image cash letter is a valid X9.37 record type and if not, the process ends. If the image cash letter is a valid X9.37 record type, then in block 407 it may be determined if this is a type 52 image record and if not, then in block 408 the X9.37 record type may be validated by determining what record type the image record comprises. If it is a type 52 image record, then in block 416 a TIFF image may be located in the type 52 record. In block 417, the front versus the back of the TIFF image may be tracked and any missing images are reported. In block 418, the image length is compared with standard image length and validated, and lengths for maximum, minimum and average are accumulated. In block 419, any length exceptions may be reported and stored in block 420 in a TIFF error summary file. In block 421, an image file header (IFH) order may be validated, e.g., big vs. little endian. In block 422, a first image file directory (IFD) entry may be located within the TIFF image.

In block 423 a next IFD entry may be located within the TIFF image. In block 424, it may be determined if this is the end of the IFD entries and if so, in block 425 the process returns again to block 401 to get the next input record. If this is not the end of the IFD entries, then in block 426 a current TIFF tag may be validated per validation rules. In block 427 TIFF tag validation rules for each TIFF tag type may be retrieved to perform the validation. In block 428 it may be determined if there are any TIFF errors and if so, in block 429 TIFF errors may be generated to the summary file and in block 420 stored in a TIFF error summary file. Also, in block 430 error reports may be printed. In block 431 reports may be printed for the current image. In block 415 any of many various types of reports may be generated such as, for example, a tag run summary report, a tag error summary report, a tag error detail report, a tag summary of record types report, a tag TIFF tags report, a tag daily error summary report, etc. If in block 428, there are no TIFF errors, then in block 431 reports for the current image may be printed and in block 415 any of the various reports mentioned previously may be generated.

After in block 408 the X9.37 record type is validated, then in block 409 it may be determined if this is a valid record type and if so, in block 410 the X9.37 record may be validated per this record type. In block 411 all errors for the current X9.37 record may be generated per a rules file in which X9.37 data validation rules by record type at the field level that are stored, which was retrieved in block 412. Then in block 413 reports for the current record may be printed and/or in block 415 any of the other various reports mentioned previously may be generated, and then in block 414 the process returned again to block 401 to get the next input record. If in block 409 the record type is not valid, then in block 411 all errors for the current X9.37 record may be generated per the rules file and in block 413 reports for the current record printed and/or in block 415 reports generated and then in block 414, the process proceeds again to block 401 to get the next input record.

FIG. 5 shows a diagram of a tag system wide error summary report according to an exemplary embodiment of the present invention. The error report 500 is shown in a table format with columns denoting the error severity level 501, a description of the error message 502, a percent of the total errors 503, a total of TIFF/X9.37 errors 504, and a number of customers that originated the errors 505. The severity level 501 lists a numerical value (in this example, 1, 2, and 3) to denote how serious the error is where a "1" may denote a most severe error. The error message column 502 shows a detailed description of each particular error that has been found with a particular image. At the bottom of the column for percentage of total errors 503 is a summary (i.e., 100%) and at the bottom of the total TIFF/X9.37 error column 504 is also a total number of errors detected on a system wide basis (e.g., 11,274). This is just one example of several types of error reports that may be generated.

Figure 6:
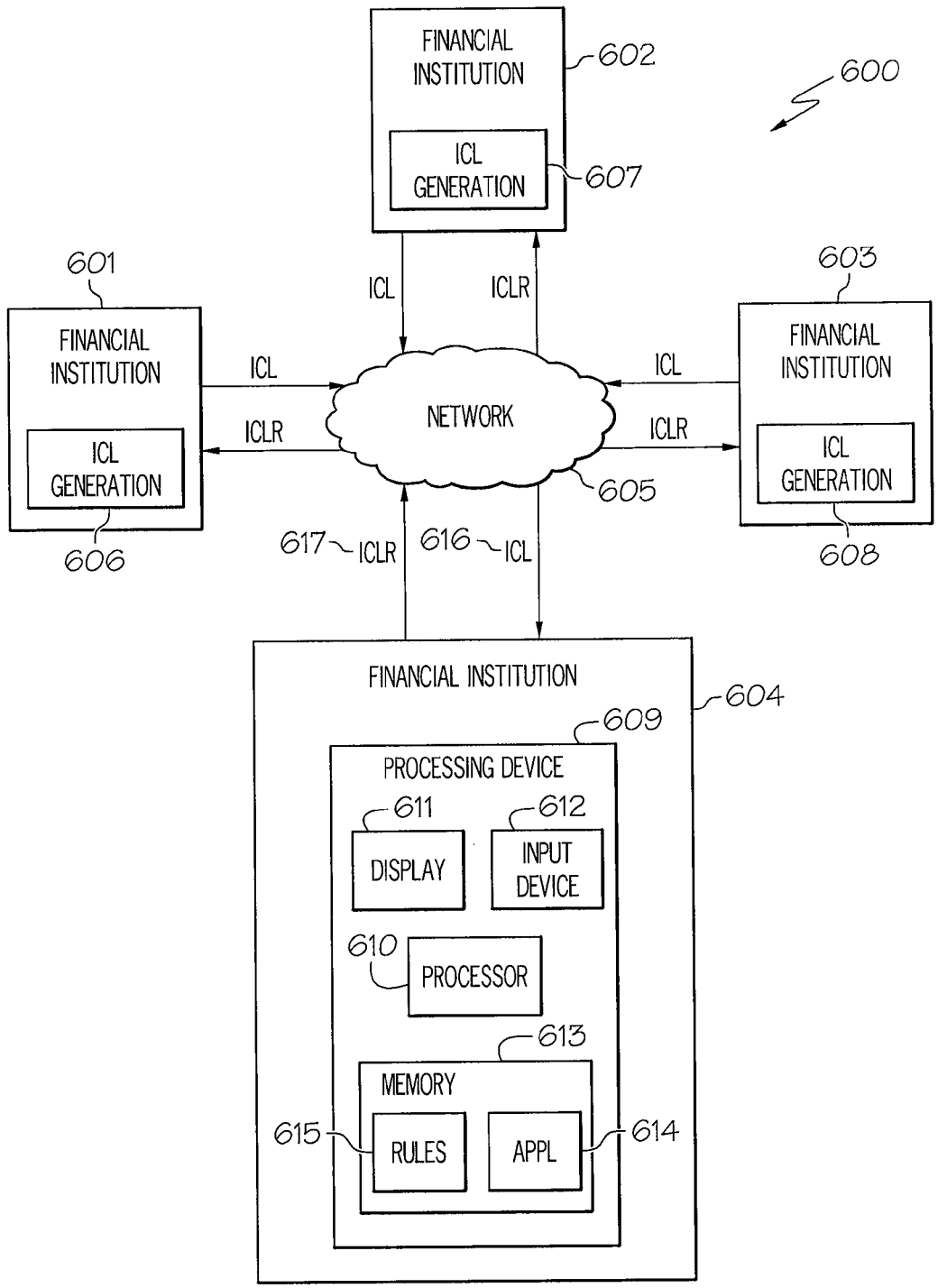
FIG. 6 shows a diagram of a system for TIFF validation according to an exemplary embodiment of the present invention.

FIG. 6 shows a diagram of a system for TIFF validation according to an exemplary embodiment of the present invention. The system 600 may include one or more financial institutions 601, 602, 603, 604 that may be interconnected via a network 605. Although a network is shown interconnecting the financial institutions, the financial institutions may be directly connected to each other by some other type of connection other than a network. The financial institution 601 may have an image cash letter generation process and/or device 606 for generating image cash letters that may be sent to another financial institution 604 via the network 605. Similarly, a second financial institution 602 may have its own image cash letter generation process/apparatus 607 and a third financial institution 603 may have its own image cash letter process/apparatus 608 for generating image cash letters that may be sent or retrieved by another financial institution 604 via the network 605.

The fourth financial institution 604 may receive image cash letters 616 from the financial institutions, 601, 602, 603, and process these image cash letters using a processing device 609. The processing device 609 may include the processor 610 that is interconnected to a display device 611, an input device 612, and a memory device 613. The memory 613 may include a TIFF validator application 614 as well as TIFF validation rules 615. The processor 610 may execute the application 614 that processes the received image cash letters and validates that each image cash letter satisfies TIFF validation rules 615. The application 614 may also generate one or more summary files of all image cash letters that fail validation rules based on selections made by a user at the processing device 609 using the input device 612 and viewing the TIFF validation process information on the display 611. The processor 610 and/or application 614 may automatically notify originators of image cash letters that fail the TIFF validation rules. This may occur by sending an image cash letter returns cash letter 617 back to the appropriate financial institution 601, 602, 603 via the network 605.

Although in this exemplary embodiment the image cash letters are generated and sent by a financial institution, any type of source may generate and send image cash letters such as, for example, a business, a vendor, an organization, a person, etc. and still be within the scope of the present invention. Further, although only one financial institution is shown as receiving the image cash letters, each of the financial institutions may have the capability to receive image cash letters and perform TIFF validation, report generation, and notification to originators of image cash letters with failed images. To help illustrate embodiments of the present invention, TIFF images have been used. However, the images could be in any format (JPEG, or others) that contains encoded information in addition to the image itself and still be within the scope of the present invention. Moreover, although embodiments have been shown using as input an X9.37 image cash letter file, the input could be a file, a collection of files, or databases that contain images to be analyzed and still be within the scope of the present invention.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for image and Tag Image File Format (TIFF) validation comprising:
 receiving a plurality of image cash letters (ICLs) sent from a plurality of originating entities;
 validating, by a computing device processor, that each image in the image cash letter satisfies defined image and TIFF validation rules, wherein the TIFF validation rules include validating TIFF tag type, TIFF tag count and TIFF tag value in each image of the ICLs and the image validation rules include (1) validating the minimum and maximum size, in units of digital information and length, of a front check image and back check image and (2) an image file header (IFH) order;

identifying, by a computing device processor, image cash letters that have one or more non-conforming images that do not pass the image and TIFF validation rules;

generating, by a computing device processor, a modified ICL for each identified ICL, wherein the modified ICL replaces each non-conforming image with a general ledger debit, wherein the general ledger debit in the modified ICL is operative to insure that a deposit associated with the non-conforming image remains in balance;

generating, by a computing device processor, an image cash return letter (ICLR) for each identified ICL, wherein the ICLR includes the general ledger debits and the one or more non-conforming images;

automatically communicating, by a computing device processor, the ICLR to a corresponding originating entity; and generating, by a computing device processor on a periodic basis, an ICL validation error summary report that includes errors listed by originating entity.

2. The method according to claim 1, further comprising generating, by a computing device processor, a summary file including all the at least one image cash letters that includes images that do not pass the image or TIFF validation rules.

3. The method according to claim 2, wherein generating the summary file further comprises generating, by the computing device processor, the summary file comprising at least one of errors encountered in the at least one image cash letter, errors encountered in the at least one image cash letter listed by error type, or contact information for institutions originating image cash letters with errors.

4. The method according to claim 2, generating, via a computing device processor, the ICL validation error summary report from the summary file, the report further comprising at least one of a run summary report, an error summary report, an error detail report, a record type report, or a TIFF tags report.

5. The method according to claim 2, further comprising generating, via a computing device processor, the summary file periodically.

6. The method according to claim 5, further comprising generating, via a computing device processor, the summary file one of daily or several times within a day.

7. The method according to claim 1, further comprising making corrections to an image cash letter generation process at the originating entity, in response to the originating entity receiving the ICLR.

8. The method according to claim 1, further comprising validating, via a computing device processor, that each image in each at least one image cash letter has a front image and a back image.

9. The method according to claim 1, further comprising validating, via a computing device processor, each image in each at least one image cash letter was scanned within a defined scanning resolution range.

10. An apparatus comprising a non-transitory computer readable storage medium with instructions stored therein, the instructions when executed causing a processing device to perform:

receiving a plurality of image cash letters (ICLs) sent from a plurality of originating entities;

validating that each image in the image cash letter satisfies defined image and TIFF validation rules, wherein the TIFF validation rules include validating TIFF tag type, TIFF tag count and TIFF tag value in each image of the ICLs and the image validation rules include validating (1) the minimum and maximum size, in units of digital information and length, of a front check image and back check image and (2) an image file header (IFH) order;

identifying image cash letters that have one or more non-conforming images that do not pass the image and TIFF validation rules generating a modified ICL for each identified ICL, wherein the modified ICL replaces each non-conforming image with a general ledger debit, wherein the general ledger debit in the modified ICL is operative to insure that a deposit associated with the non-conforming image remains in balance;

generating an image cash return letter (ICLR) for each identified ICL, wherein the ICLR includes the general ledger debits and the one or more non-conforming images;

automatically communicating the ICLR to a corresponding originating entity; and generating, on a periodic basis, an ICL validation error summary report that includes errors listed by originating entity.

11. The apparatus according to claim 10, further comprising communicating the ICL validation error summary report to the corresponding originating entity.

* * * * *